US006737016B2

(12) United States Patent
Shikata et al.

(10) Patent No.: US 6,737,016 B2
(45) Date of Patent: May 18, 2004

(54) PROCESS FOR MANUFACTURING SINTERED SLIDE BEARING

(75) Inventors: Hideo Shikata, Chiba (JP); Hidekazu Tokushima, Chiba (JP); Tadayoshi Yano, Chiba (JP)

(73) Assignee: Hitachi Powdered Metals Co, Ltd., Chiba (JP)

( * ) Notice: Subject to any disclaimer, the term of this patent is extended or adjusted under 35 U.S.C. 154(b) by 0 days.

(21) Appl. No.: 10/141,905

(22) Filed: May 8, 2002

(65) Prior Publication Data

US 2003/0031579 A1 Feb. 13, 2003

(30) Foreign Application Priority Data

May 9, 2001 (JP) ..................... P2001-138067

(51) Int. Cl.⁷ .................................. B22F 3/26
(52) U.S. Cl. ........................ 419/27; 2/28; 2/29; 2/38
(58) Field of Search ................. 419/2, 27, 28, 419/29, 38

(56) References Cited

U.S. PATENT DOCUMENTS

| | | | | | |
|---|---|---|---|---|---|
| 3,305,325 A | * | 2/1967 | Le Brasse et al. | .......... | 428/545 |
| 4,767,677 A | * | 8/1988 | Kuwayama | .......... | 428/551 |
| 4,923,761 A | * | 5/1990 | Shindo | .......... | 428/550 |
| 5,447,774 A | * | 9/1995 | Tanaka et al. | .......... | 428/141 |
| 6,299,356 B1 | * | 10/2001 | Okamura et al. | .......... | 384/114 |
| 6,461,679 B1 | * | 10/2002 | McMeekin et al. | .......... | 427/369 |
| 6,465,089 B2 | * | 10/2002 | Niwa et al. | .......... | 428/323 |

FOREIGN PATENT DOCUMENTS

| | | |
|---|---|---|
| JP | 64-83920 | 3/1989 |
| JP | 07-216411 | 8/1995 |
| JP | 09-200998 | 7/1997 |
| JP | 10-112955 | 4/1998 |
| JP | 10-160639 | 6/1998 |
| JP | 11-62948 | 3/1999 |

* cited by examiner

Primary Examiner—Ngoclan Mai
(74) Attorney, Agent, or Firm—Kilpatrick Stockton LLP

(57) ABSTRACT

Disclosed is a process for manufacturing a sintered slide bearing. A sintered porous bearing body is prepared from a powdered metal material and a resin material in a fluidable state is penetrated into the sintered porous bearing body. The resin material in the sintered porous bearing body is hardened, and the sintered porous bearing body after the hardening of the resin material is repressed to reduce a gap produced between the sintered porous bearing body and the hardened resin material by volume reduction caused on the resin material at the hardening.

12 Claims, No Drawings

PROCESS FOR MANUFACTURING SINTERED SLIDE BEARING

BACKGROUND OF THE INVENTION

1. Field of the Invention

The present invention relates to a process for manufacturing a sintered bearing, and specifically relates to a process for manufacturing a sintered slide bearing in which the bearing surface of the slide bearing or the grooved surface of hydrodynamic bearing is sealed.

2. Related Art

Sintered bearings includes some different types of bearings such as: an oil-impregnated bearing whose sliding surface is self-lubricated; an oil-impregnated bearing with a hydrodynamic groove formed on the inner peripheral surface or a terminal surface thereof; and a fluid type slide bearing (Japanese Laid-Open Patent Publication (JPA) No. S64-83920, etc) in which a slide bearing or a hydrodynamic grooved slide bearing is enclosed in a cup-shaped housing and a lubricating oil is filled in the housing to supply it to the periphery of the bearing.

The fluid type slide bearing is used for the polygon miller drive of a laser beam printer, a spindle motor of a disc drive and the like. The lubricating oil is possibly composed of an oil with low viscosity or a magnetic fluid, and, in the case of using the magnetic fluid, a permanent magnet is provided adjacent to the bearing. In order to enhance the action of dynamic pressure more highly, it is important that, among the pores of the bearing, those on the surface, especially on the bearing surface, be blocked or decreased (i.e. pores be closed). As the closing measures, there are a method that a sintered bearing is formed in high density, a method that a finish processing such as various blast finishings or tumble polishings is carried out to the bearing, and a method that a resin to be impregnated and cured in the pores is used for sealing the pores (Japanese Laid-Open Patent Publication (JPA) No. H11-62948, etc). The sealing of pores with a resin is carried out specifically by procedures of the impregnation of a resin, the removal of an extra resin, and the curing of the resin (Japanese Laid-Open Patent Publication (JPA) No. H7-216411).

The above-mentioned sealing of pores with a resin does not have a problem of weight increase such that arises in the case of making the bearing in high density, and it has relatively better efficiency in production in comparison with other measures for closing pores. However, it has the following problems. Namely, since the resin impregnated is shrunk when being cured and the impregnation amount and shrinking ratio become uneven, it is difficult to certainly regulate the opening ratio of the surface or the degree of sealing pores and pores cannot be perfectly blocked by the resin impregnated and cured at one time. Moreover, the smoothness of a bearing surface is also damaged at the cured condition of the resin. It may be also considered that viscosity of the resin to be used is made low and a vacuum impregnation is also applied, in order to certainly and sufficiently impregnate the resin. However, it takes much time and is inefficient. In the fluid type slide bearing as described above, there are some occasions, as described in Japanese Laid-Open Patent Publication (JPA) No. H10-112955, where the pores of a bearing is impregnated with a thermoplastic having a coefficient of thermal expansion which is larger than that of the material of the bearing, so that, after the curing, fine gaps are produced in the pores at a low temperature condition and those fine gaps are blocked by the expansion of the resin when the temperature is raised. However, it is difficult to control the amount of the resin to be impregnated and cured.

BRIEF SUMMARY OF THE INVENTION

In order to solve the above-mentioned problems, it is an object of the present invention to provide a process for manufacturing a sintered slide bearing in which the treatment for sealing pores of the sintered bearing body using a resin is carried out, and which enables to manufacture a sintered slide bearing having pores in which gaps are made small or blocked, by an decreased number of steps while keeping quality.

In order to achieve the above-mentioned object, a process for manufacturing a sintered slide bearing according to the present invention comprises: preparing a sintered porous bearing body from a powdered metal material; penetrating into the sintered porous bearing body a resin material in a fluidable state; hardening the resin material in the sintered porous bearing body; and repressing the sintered porous bearing body after the hardening of the resin material, to reduce a gap produced between the sintered porous bearing body and the hardened resin material by volume reduction caused on the resin material at the hardening.

The features and advantages of the manufacturing process according to the present invention over the proposed methods will be more clearly understood from the following description of the embodiments of the present invention

DETAILED DESCRIPTION OF THE EMBODIMENTS OF INVENTION

Embodiments of the process for manufacturing a sintered slide bearing according to the present invention will be described.

In the present invention, the impregnation and curing of a resin are carried out to a sintered porous body that includes a sintered body obtained direct by sintering a green compact which is formed by pressing a powdered metal into a predetermined shape, and a pre-sized article obtained from the sintered body by pre-sizing the sintered body. If the sintered body is completely repressed by coining or sizing, which are carried out in general as the secondary processing, the pores of the sintered body are deformed and shrunk by compression, causing a reduced impregnation property with a resin. This generates fluctuation of impregnation amount and the shortage of impregnation when the impregnation is performed at a normal pressure, and the falling off is caused by them. Therefore, in order to prevent the above problems, the resin is impregnated into the pores of the sintered body and cured before it is placed in a die to repress the sintered porous body for plastical processing. In accordance with the above procedure, it is preferably impregnated and the resin in pores becomes in conditions of close packing or perfect sealing. In other words, gaps in the pores can be surely and ideally closed by the subsequent plastic processing or repressing.

Here, the sintered porous body after the plastic processing, may be further treated with coining or sizing as the secondary processing, depending on the modes of the slide bearing. Specifically, (1) a mode in which gaps in the pores are reduced or blocked by a plastic processing which is carried out after impregnation and curing of the resin, and grooves or the like are mainly formed by coining or sizing as the subsequent secondary processing, and (2) a mode in which gaps in the pores are reduced to a predetermined value by the plastic processing which is carried out after impregnation and curing of the resin, and grooves or the like are formed by coining or sizing as subsequent secondary processing while the reduced gaps in the pores are further reduced or blocked, are included. Alternatively, the plastic processing itself can also include the coining or sizing for determining the shape or dimensions which are generally carried out as a secondary processing for the porous sintered body. This mode can be carried out without using an additional die for a plastic processing. If the slide bearing to be produced is in a small size and the precision of dimensions of the sliding surface and the like is highly required, it is preferred, in order to enhance dimensional precision of the final product, that a porous sintered body to which a preliminary sizing is carried out so as not to substantially crush the pores of the sintered body is used to impregnate with a resin to be cured, before the plastic processing and/or another processing including it or coining or sizing as a secondary processing in the similar manner to the above. The resin to be used is preferably a resin which has wettability to the sintered body for exhibiting impregnation property and has low viscosity. According to the comparative test of commercially available products, an acryl-based thermosetting resin shows a suitable performance.

The process for manufacturing the sintered slide bearing according to the present invention will be specifically described below. In the description, the porous sintered body, the impregnation and curing of the resin, the plastic processing and the property of the slide bearing will be described in order.

(1. Porous Sintered Body)

The sintered porous body can be a sintered body which is obtained direct by sintering a green compact formed by pressing a raw material powder in a die assembly (an assembly of a die body with a die hole, a core rod to be inserted into the die hole, and upper and lower punch), or a sintered body which is obtained by subjecting the sintered body to preliminary repressing or sizing so as not to perfectly break the pores. As the raw metal powder, a powder of simple metal or alloy, containing iron or copper, such as iron-based alloy, copper-based alloy or the like is suitably used, and specific examples of the alloy material includes Fe—Cu alloy, Cu—Sn alloy, Cu—Sn—P alloy, Cu—Zn alloy, Cu—Sn—Al alloy and the like. However, it should not be limited to the above specific examples. The density of the sintered porous body is not strictly limited, and various sintered porous body such as one having a low density to make a bare handling, one having a higher density than that of a usual sintered oil-impregnated bearings and the like are usable. Namely, the sintered porous body usable in the present invention is a sintered body whose pores are not completely closed by a secondary processing such as the coining, sizing and the like, and it is a measure that a fluidable resin is possibly impregnated to penetrate the resin into the sintered porous body. This is not only necessary for simplification of a method for manufacturing, but also essential for keeping the impregnation property of a resin.

However, from the practical and operational reasons, the sintered porous body is preferred to have a density ratio of 75 to 85%.

(2. Impregnation and Curing of Resin)

The resin is impregnated in the sintered body in a flowable condition such as a liquid or a solution. For the resin to be used, it is not a severe requirement whether the resin is a thermoplastic resin or a thermosetting resin, and the matter which is required for the resin is that it is easily impregnated, it is hardly adhered on the surface of the sintered body and adhered one is easily removed. It is also important that the resin has durability to the lubricating oil, and the resin having a good heat resistance and sliding property is preferable to use. As those having good impregnation property, a thermosetting resin liquid and a thermoplastic resin liquid whose viscosity is lowered by adding a solvent can be illustrated. However, thermosetting resin such as acrylic resin, phenol resin, unsaturated polyester resin, epoxy resin, silicone resin, polyimide resin and the like is preferable. According to the result obtained by testing various resins, an acryl-based thermosetting resin has suitable properties in total. The available products of such a resin include, for example, a product with the trade name "RESINOL-90C" manufactured by Henkel Japan Co. Ltd. The operation of impregnation is preferably under reduced pressure, but a usual impregnation under normal pressure is of course possible. The sintered porous body impregnated with the resin is preferably placed in boiling water to cure the resin. The sintered body after the resin is cured is washed with hot water or cold water to clean the surface and then dried. Thus a slide bearing body in which the resin is filled and cured in the pores of the sintered body is obtained. It is preferred that the impregnated resin is in a condition that the resin penetrates into the pores located at the central portion of the sintered body, but it is of course permissible to be in a condition that the resin is filled only in the pores near the peripheral surface and those of the central portion are incompletely impregnated. In this condition, the resin seals the pores and its permeability with oil is remarkably reduced, although the amount of remaining continuous holes increases according as the density of the sintered porous body is reduced.

(3. Plastic Processing)

As described above, the sintered porous body in which the resin is impregnated and cured (hereinafter, referred to as a crude bearing) is plastically processed or repressed, using a die. The die for the plastic processing is not limited to its proprietary mold, but a die for coining or sizing can also be used. When the crude bearing is repressed in the die and partially or wholly compressed, the pores of the crude bearing at the compressed portion are made small and pressed to the resin which has been charged and cured in the pores so as to shut the resin therein, so that gaps between the pores of the crude bearing and the resin are reduced and the continuous hole is blocked off. It is essential for the plastic processing that the oil permeability is eliminated from the crude bearing. Even if the gaps are not completely blocked at the portion which has large pores, the oil permeability is possibly eliminated if only the gaps are blocked at the portion which has comparatively small pores communicating the large pores. The portion at which the crude bearing is positively pressed to make a compression can be determined to a requisite part or the whole of the inner bore surface (bearing surface) or an end face, etc., according to requirement.

The plastic processing according to the present invention and the coining or sizing for giving a shape or dimensions of the sintered body (the crude bearing) can be carried out at the same time. The manufacturing process can be carried out without using an additional mold for the plastic processing, through the procedures of: pressing the raw material powder in a die to form a green compact; sintering the compact; impregnating and curing of a resin; and repressing for the purpose of coining or sizing. As the mode of carrying out the coining, there is an occasion where hydrodynamic grooves are formed on the crude bearing at the end face which receives a thrust load. When the crude bearing is stamped by pressing with a punch which was provided with a concave portion for forming the grooves, the gaps between the pores and the resin are reduced or blocked at the grooved portion of the end face of the crude bearing corresponding to the concave portion. If the coining is unnecessary, the sizing using a die assembly (a die body with a die hole, a core rod which is inserted into the die hole, and upper and lower punches) is usually carried out. In the sizing, the gaps between the pores and the resin are reduced or blocked by compressing the whole of the crude bearing impregnated with the resin and raising density. It is appropriately determined which is selected of negative sizing and positive sizing, depending on the material, the size and the shape of the bearing and the deformation amount by sizing, and the like. If the hydrodynamic groove which is parallel to the axial direction is formed on the inner bore surface, the crude bearing having no grooves is sized using a core rod for forming the grooves, whereby the grooved portion is made more minute and the sealing of pores becomes more perfectly achieved. The grooved portion of this mode is made by positive sizing. If a groove of a herringbone pattern is formed by a core rod, it is made by negative sizing. It is also possible to perform both of sizing and coining simultaneously, depending on the form of the slide bearing.

The range of effective pressure applied at the plastic processing depends on the conditions of crude bearing, but it is practically preferred to set in a range of about 150 to 300 MPa.

(4. Property of Bearing)

The sintered slide bearing which is obtained as described above has substantially no oil-impregnation property or no oil permeability by the resin sealing, and when rotational operation is carried out while interposing a lubricating oil between the sliding surface and a rotating shaft, the lowering of oil pressure at the sliding portion which is caused by absorption of the oil in pores does not occur as in the case of an oil-impregnated bearing. Therefore, the sliding property is exhibited well, even when the surface pressure of the bearing is high. The sintered slide bearing is suitable for the bearing element which is equipped with an oil supply mechanism. Accordingly, it is usable for a mode in which an oil supplier is externally provided, or a mode in which a lubricating oil is filled in a bearing accommodating container like a bearing for spindle motors. Moreover, even when the manufacturing process is applied to production of a bearing with a smooth sliding surface having no hydrodynamic grooves, the similar effect and the action of oil pressure described above is obtained if it is used as a bearing element having a structure in which a lubricating oil is always supplied to the sliding portion of the bearing. The optimum example of application is a bearing having hydrodynamic grooves at the sliding portion, in particular, a spindle bearing. Since the escape of oil pressure is perfectly eliminated by the sealing of the pores at the grooves of slide bearing surface, higher hydrodynamic pressure is obtained. Moreover, if this manufacturing process is applied to a porous sintered body having low density, the weight of a slide bearing can be made small.

EXAMPLES

Example 1 and Comparative Example 1
(Preparation of Sintered Slide Bearing)

Mixing an iron powder and a copper powder at a Cu ratio of 40% by mass, a mixed powder was prepared. The mixed powder was pressed in a die to form a tubular compact having dimensions of a 10 mm bore diameter, a 16 mm outer diameter and a 10 mm length and a density ratio of 80%. The tubular compact was then sintered at a temperature of 780 degrees centigrade to obtain a sintered porous body.

The sintered porous body prepared above was disposed at vacuum pressure, and Acrylic resin (thermosetting resin sold by Haenkel Japan Co. Ltd. with the trade name, RESINOL 90C) was then impregnated into the sintered porous body. The impregnated body was subjected to centrifugal treatment to remove surplus resin from the surface of the sintered porous body, and it was then placed in the water heated to 90 degrees centigrade for ten minutes to thermoset the impregnated resin, thereby obtaining a crude bearing. This crude bearing itself was used as a sample of Comparative Example 1 of the sintered slide bearing without repressing.

Moreover, the crude bearing obtained above was further sized at a pressure of 200 MPa in order to prepare a sample of Example 1 of the sintered slide bearing according to the present invention.

(Estimation of Sample)

For each of the samples, supplying synthetic oil as a lubricating oil to the bearing surface of the sintered slide bearing and coupling it with a rotating shaft, the frictional coefficient of the bearing surface when driving the rotating shaft was measured, while the surface pressure, P, and the rotating speed, V, of the rotating shaft were controlled. Repeating the measurement of frictional efficient at various surface pressures and rotating speeds, the relationship between the frictional coefficient and the ratio of the rotating speed, V, to the surface pressure, P, was obtained. The results are shown in Table 1.

TABLE 1

| Sample | Frictional Coefficient V/PRatio[m/(s·MPa)] | | | | | |
|---|---|---|---|---|---|---|
| | 0.1 | 0.3 | 0.8 | 3.0 | 5.0 | 10.0 |
| Example 1 | 0.045 | 0.03 | 0.02 | 0.018 | 0.023 | 0.05 |
| Comparative Example 1 | 0.07 | 0.045 | 0.03 | 0.022 | 0.025 | 0.055 |

As shown in Table 1, the frictional coefficient of the bearing surface is clearly reduced by subjecting the sintered porous body to repressing after the resin impregnated in the sintered porous body is hardened. The reason for the above results is considered that, since the blocking of pores prevents the oil from being absorbed into pores, the mode of lubrication is not changed to boundary lubrication and the frictional coefficient is maintained small. Accordingly, the effect is remarkable especially under the conditions that the rotation speed is low and the surface pressure is high (the V/P ratio is small), under which the boundary lubrication is easily caused.

Example 2 and Comparative Example 2
(Preparation of Sintered Slide Bearing)

The same operation for preparation of sintered slide bearing in Example 1 was repeated to obtain a crude bearing, excepting that the green compact was formed to have dimensions of a 3 mm bore diameter (inscribed circle diameter), a 5 mm outer diameter and a 10 mm length, and that the radial clearance between the bore surface (bearing surface) and the rotating shaft to be supported had a three love bearing shape as being described in Japanese Laid-Open Patent Publication (JPA) No. H9-200998 and designed to produce distribution of pressure in oil membrane by dynamic pressure. This crude bearing itself was used as a sample of Comparative Example 2 of the sintered slide bearing without repressing.

The crude bearing obtained above was further sized at a pressure of 200 MPa to have a sample of Example 2 of the sintered slide bearing as a dynamic pressure slide bearing according to the present invention.

(Estimation of Sample)

Using a bearing torque testing machine as described in Japanese Laid-Open Patent Publication No. H10(1998)-160639, which had a rotating shaft equipped with a disk unbalanced with a weight (0.3 g·cm), the following operation was conducted for each of the samples of the sintered slide bearing.

First, supplying synthetic oil as a lubricating oil to the bearing surface of the sintered slide bearing, the sintered slide bearing was fixed to the opening formed on the housing table of the bearing torque testing machine and coupled with the rotating shaft. Next, driving the rotating shaft, the amount of run-out of the rotating shaft was measured by detection with a displacement sensor, and the relationship between the amount of run-out and the rotating speed (the number of rotation) of the rotating shaft was obtained by repeating the measurement at various rotating speeds. The results are shown in Table 2.

TABLE 2

| Sample | Run-OutofRotatingShaft[micron] Number of Rotation [rpm] | | | |
|---|---|---|---|---|
| | 3000 | 5000 | 7000 | 9000 |
| Example 2 | 1.2 | 1.6 | 2.0 | 2.3 |
| Comparative Example 2 | 1.6 | 2.5 | 3.4 | 4.7 |

As clearly shown in Table 2, the amount of run-out of the rotating shaft is reduced by repressing the resin-impregnated sintered porous body after the hardening of the resin. This is considered as the effect of closing the gap between the sintered porous body and the hardened resin material to prevent the dynamic pressure from being released, and it is remarkably especially at high speed rotations.

According to the manufacturing process of the present invention, after the pores of a sintered porous bearing body are impregnated with a resin to be cured, gaps in the pores are reduced or blocked by a plastic processing or repressing in which the sintered body is placed in a die and pressed. Accordingly, the gaps in the pores possibly approach more surely to a completely blocked state, and the sintered slide bearing can be produced by a decreased number of steps, with suppressing fluctuation of quality. As a result, the present invention can produce a bearing having no oil-impregnation property or no oil permeability, especially a bearing having the slide bearing portion formed with hydrodynamic grooves, by sealing the pores, with suppressing complication of the manufacturing process and increase of a cost. And, when the bearing obtained is used for the polygon miller drive of a laser beam printer or a spindle motor bearing element for the hard disc drive of a computer, it exhibits superior dynamic pressure effect and can contribute to the improvement of a high speed rotational property.

It must be understood that the invention is in no way limited to the above embodiments and that many changes may be brought about therein without departing from the scope of the invention as defined by the appended claims.

What is claimed is:

1. A process for manufacturing a sintered slide bearing, comprising:

preparing a sintered porous bearing body from a powdered metal material;

penetrating into the sintered porous bearing body a resin material in a fluidable state;

removing surplus resin material from the surface of the sintered porous bearing body;

hardening the resin material in the sintered porous bearing body; and repressing the sintered porous bearing body after the hardening of the resin material, to reduce a gap produced between the sintered porous bearing body and the hardened resin material by volume reduction caused on the resin material at the hardening.

2. The manufacturing process of claim 1, wherein the powdered metal material contains at least one of iron and copper.

3. The manufacturing process of claim 1, wherein the powdered metal material comprises a composition which is selected from the group consisting of copper-tin, copper-tin-phosphorus, copper-zinc and copper-tin-aluminum.

4. The manufacturing process of claim 1, wherein the preparing of the sintered porous bearing body comprises:

forming a green compact from the powdered metal material by pressing the powdered metal material; and sintering the green compact to produce the sintered porous bearing body.

5. The manufacturing process of claim 4, wherein the preparing of the sintered porous bearing body further comprises:

preliminarily sizing the sintered porous bearing body not to lose porosity of the sintered porous bearing body.

6. The manufacturing process of claim 1, wherein the resin material in a fluidable state includes one of a solution of a thermoplastic resin in a solvent and a thermosetting resin.

7. The manufacturing process of claim 1, wherein the resin material in a fluidable state includes a thermosetting resin which is selected from the group consisting of acrylic resin, phenol resin, unsaturated polyester resin, epoxy resin, silicone resin and polyimide resin.

8. The manufacturing process of claim 1, wherein the hardening of the resin material comprises:

heating the sintered porous bearing body in a heated aqueous liquid.

9. The manufacturing process of claim 1, wherein the repressing of the sintered porous bearing body comprises:

sizing the sintered porous bearing body to make the dimensions of the sintered porous bearing body correspond to the dimensions of the sintered slide bearing.

10. The manufacturing process of claim 1, wherein the repressing of the sintered porous bearing body comprises:

coining the sintered porous bearing body.

11. The manufacturing process of claim 1, wherein the repressing of the sintered porous bearing body comprises:

bringing compression on the metal material at the surface of the sintered porous bearing body to reduce surface porosity of the sintered porous bearing body.

12. The manufacturing process of claim 1, wherein the sintered porous bearing body is repressed at a repressing pressure of 150 to 300 MPa.

* * * * *